United States Patent
Bresolin

(10) Patent No.: US 8,191,846 B2
(45) Date of Patent: Jun. 5, 2012

(54) MAGNETIC SUPPORT FOR AQUARIUM FITTINGS

(75) Inventor: Valerio Bresolin, Vicenza (IT)

(73) Assignee: Hydor SRL, Vicenza (IT)

( * ) Notice: Subject to any disclaimer, the term of this patent is extended or adjusted under 35 U.S.C. 154(b) by 266 days.

(21) Appl. No.: 12/306,290

(22) PCT Filed: Jun. 14, 2007

(86) PCT No.: PCT/IT2007/000421
§ 371 (c)(1),
(2), (4) Date: Dec. 23, 2008

(87) PCT Pub. No.: WO2007/148364
PCT Pub. Date: Dec. 27, 2007

(65) Prior Publication Data
US 2009/0189034 A1    Jul. 30, 2009

(30) Foreign Application Priority Data

Jun. 23, 2006   (IT) .............................. VE20060021 U

(51) Int. Cl.
*A47G 1/17* (2006.01)
(52) U.S. Cl. ................ 248/309.4; 248/309.3; 248/206.5; 248/205.5
(58) Field of Classification Search ............... 248/309.4, 248/206.5, 205.5, 206.2, 206.3, 309.3, 683, 248/467
See application file for complete search history.

(56) References Cited

U.S. PATENT DOCUMENTS

| | | | |
|---|---|---|---|
| 2,642,248 A | 6/1953 | Semon | |
| 3,325,639 A | 6/1967 | King | |
| 5,028,223 A * | 7/1991 | Ameter | 425/12 |
| 5,778,824 A | 7/1998 | Musgrave et al. | |
| 6,724,902 B1 * | 4/2004 | Shennib et al. | 381/328 |
| 7,271,697 B2 | 9/2007 | Whittaker et al. | |
| D567,821 S | 4/2008 | Tunze et al. | |
| 2004/0018104 A1 | 1/2004 | Watkins | |
| 2006/0090278 A1 * | 5/2006 | Hang | 15/220.2 |
| 2006/0152322 A1 | 7/2006 | Whittaker et al. | |
| 2006/0192062 A1 | 8/2006 | Tunze | |
| 2007/0290783 A1 * | 12/2007 | Whittaker et al. | 336/229 |

FOREIGN PATENT DOCUMENTS

| | | |
|---|---|---|
| DE | 69 24 109 | 2/1970 |
| DE | 69 24 109 U | 2/1970 |
| DE | 72 47 210 U1 | 3/1973 |

(Continued)

OTHER PUBLICATIONS

Request for nullification of German Utility Model No. 20 2005 003 170 U1, dated Aug. 12, 2009.

(Continued)

*Primary Examiner* — A. Joseph Wujciak, III
(74) *Attorney, Agent, or Firm* — Griffin & Szipl, P.C.

(57) ABSTRACT

A magnetic support (10) for aquariums includes a first and a second support element (20a, 20b), each of them having a magnet (26a, 26b) so that by coupling the first and second support elements (20a, 20b) by interposing an aquarium wall (50) between them, the attracting magnetic force operating between the two magnets (26a, 26b) locks the two support elements (20a, 20b). Each support element (20a, 20b) comprises a flat element (40a, 40b) made up of flexible material having a peripheral projecting lip (46a, 46b), so that when the two support elements (20a, 20b) are coupled together by interposing the wall (50), the peripheral projecting lips (46a, 46b) are flattened against the wall (50), thus creating a suction effect.

11 Claims, 5 Drawing Sheets

FOREIGN PATENT DOCUMENTS

| | | |
|---|---|---|
| DE | 26 39 746 A1 | 3/1978 |
| DE | 87 01 460 U1 | 6/1987 |
| DE | 42 14 249 A1 | 11/1993 |
| DE | 93 00 159 U1 | 12/1993 |
| DE | 203 15 331 U1 | 1/2004 |
| DE | 20 2005 003 170 U1 | 6/2005 |
| EP | 0 276 830 | 8/1988 |
| EP | 0 739 746 A1 | 10/1996 |
| FR | 2 787 154 | 6/2000 |

OTHER PUBLICATIONS

International Search Report issued in corresponding application No. PCT/IT2007/000421, completed Nov. 15, 2007 and mailed Nov. 27, 2007.

International Preliminary Report on Patentability issued in corresponding application No. PCT/IT2007/000421, completed Oct. 17, 2008.

Hawley's Condensed Chemical Dictionary 876 (1987).

www.conformal-coating.com/parylene_coating.htm, downloaded Feb. 18, 2011, 2 pgs.

www.paryleneinc.com/pdf/PDS_Dimer_International.pdf, downloaded Feb. 18, 2011, 2 pgs.

www.scscoatings.com, webpage, downloaded Feb. 18, 2011.

www.parylene.com/technology/specifications-properties.html, downloaded Feb. 18, 2011, 2 pgs.

www.vp-scientific.com/parylene_properties.htm, downloaded Feb. 18, 2011, 4 pgs.

* cited by examiner

MAGNETIC SUPPORT FOR AQUARIUM FITTINGS

This is a National Phase Application in the United States of International Patent Application No. PCT/IT2007/000421 filed Jun. 14, 2007, which claims priority on Italian Patent Application No. VE 2006U000021, filed Jun. 23, 2006 The entire disclosures of the above patent applications are hereby incorporated by reference.

FIELD OF THE INVENTION

The present invention relates to a magnetic support for sustaining aquarium fittings, such as a pump, a filter or others.

BACKGROUND OF THE INVENTION

The magnetic supports of the prior art are made up of two support elements, each provided with a magnet and they are coupled by interposing an aquarium glass wall between them. A first support element is positioned inside the aquarium and is suitable for supporting a fitting as indicated above, whereas the other support element is positioned outside the aquarium. The magnetic force which is generated between the two magnets attracts the two element supports together clamping them against the aquarium wall and, then, locking them on the wall, exactly as in a vice. These devices are simple, functional and suitable for easily sustaining different fittings usually used in aquariums.

However, these devices have some drawbacks. In fact, it is known, the magnetic force operates suddenly and strongly when the two magnets approach each other. In fact, when the two support elements are moved closer to the aquarium wall, one element on one side of the wall and the other element on the opposite side of the wall, at a certain point the magnetic force is triggered and an attraction force is produced between the two support elements and, consequently, they are locked on the wall.

It is worth noting that the magnetic force, which operates between the two elements, has to be sufficiently strong as to avoid the detachment of the two elements.

In fact, a fitting, such as a pump or a filter, is mounted on the support element positioned inside the aquarium. This fitting not only has a predetermined weight, but it is positioned away from the aquarium wall, namely it projects from the wall, thereby the attraction force has to be quite strong in order to sustain the fitting and to prevent the accidental detachment of the support elements. Then, the locking not only occurs suddenly and strongly, but there is a more serious problem which occurs when it is necessary to separate the two support elements for one reason or another, such as to carry out the maintenance operations, cleaning or substitution of the fitting mounted on one of the two support elements; or if we want to clean the aquarium or if it is necessary to place the pump or the filter in a different position.

In this situation, due to the attracting magnetic force that operates between the two support elements, it is not easy to separate the two support elements. In fact, it is necessary to apply a strong detachment force on both the support elements and, only when the force reaches a predetermined value equal to the attracting force, which is very strong as already mentioned above, the detachment and separation of the two support elements occurs. Likewise, in the locking operation that occurs in a sudden and strong way, the separation also occurs suddenly and strongly. In fact, as soon as the detachment occurs, the attraction force immediately reduces to zero, while with the hands we are still exerting a strong detachment force, and this causes the sudden detachment of the two support elements. Moreover, this strong detachment action may damage the magnetic support, and with time, may cause the accidental detachment of the two support elements, thus making the magnetic support useless.

The aim of the present invention is to find a way so that the attracting force between the two elements, generated by the two magnets, gradually increases, so that the coupling of the two support elements and consequently the locking operation to the aquarium wall occurs gently. Above all, the magnetic support has to be made so that the necessary force to be applied in order to cause the detachment of the two support elements is reduced, as to facilitate the separation of one support element from the other one, by applying a weak force thus avoiding considerable effort or sudden pulls. The detachment has to occur in a simple and easy way, without the risk of damaging the two support elements during this operation.

SUMMARY OF THE INVENTION

This aim is reached by a magnetic support for aquariums of the initially indicated type, comprised of a first support element suitable for sustaining an aquarium fitting and a second support element, each of the first and second elements comprises at least one magnet so that by coupling the first and second support elements by interposing an aquarium wall between them, the attracting magnetic force operating between the two magnets locks the first and second support elements against the wall, characterized in that at least one of the first or second support elements comprises an essentially flat element made up of flexible material having a projecting peripheral lip, so that when the two support elements are coupled together by interposing the wall, the peripheral lip of the support element is flattened against the wall, thus creating a suction effect that gradually and firmly locks the first and second support elements to the wall.

In particular, each of the first and second support elements comprises an essentially flat element made up of flexible material having a projecting peripheral lip. It is evident that, in addition to the magnetic attracting force, there is also a suction effect that remarkably improves the locking action. In so doing, the magnets may be smaller, or in any case, of such a dimension so that their magnetic field generates a reduced magnetic force because the two support elements act like a sucker when they are moved closer to the wall and the projecting lips have been flattened against the wall. Therefore an adhesion force is generated between each support element and the aquarium wall and this force is added to the above magnetic force, so generating a total force which definitively assure the locking of the magnetic support to the aquarium wall. It is clear that the locking operation of the magnetic support to the wall occurs gradually since the magnetic attracting force is weak. Even the unlocking operation is easy, since it is sufficient to gently act on the two lips, for example to slightly bend the two supports thus eliminating the suction effect and, then, making the detachment operation of the two support elements very easy to be carried out.

Thus, in accordance with a first embodiment of the invention, a magnetic support (10μ, 100) for aquariums comprising a first support element (20*a*, 120*a*) suitable for sustaining an aquarium fitting and a second support element (20*b*, 120*b*), each of the first and second elements (20*a*, 20*b*, 120*a*, 120*b*) comprises at least one magnet (26*a*, 26*b*, 126*a*, 126*b*) so that by coupling the first and second support elements (20*a*, 20*b*, 120*a*, 120*b*) by interposing an aquarium wall (50) between them, the attracting magnetic force operating between the two magnets (26*a*, 26*b*, 126*a*, 126*b*) locks the first and second support elements (20a, 20b, 120a, 120b) against the wall (50), characterized in that at least one of the first or second support elements (20a, 20b, 120a, 120b) comprises a peripheral projecting lip (46a, 46b, 146a, 146b) made up of flexible material, so that when the two support elements (20a, 20b, 120a, 120b) are coupled together by interposing the wall (50), the peripheral projecting lip to (46a, 46b, 146a, 146b) of the support element (20a, 20b, 120a, 120b) is flattened against the wall (50), thus creating a suction effect which gradually and firmly locks the first and second support elements (20a, 20b, 120a, 120b) to the wall (50).

In accordance with a second embodiment of the invention, the first embodiment is modified so that each of the first and second support elements (20a, 20b, 120a, 120b) comprises a peripheral projecting lip (46a, 46b, 146a, 146b) made up of flexible material. In accordance with a third embodiment of the present invention, the second embodiment is further modifies so that the first and second support elements (20a, 20b) comprise an interconnecting element (202a, b) interposed between the support element (120a, 120b) and the magnet (126a, 126b). In accordance with a fourth embodiment of the present invention, the third embodiment is further modifies so that each of the interconnecting elements (202a, b) covers the front surface of the magnet (126a, 126b) which comes into contact with the wall (50) of an aquarium.

In accordance with a fifth embodiment of the present invention, the second embodiment is further modified so that the first and second support elements (20a, 20b) comprise an essentially flat element (40a, 40b) made up of flexible material having the peripheral projecting lip (46a, 46b) and which covers the front surface of the magnet (26a, 26b) which comes into contact with the wall (50) of an aquarium. In accordance with a sixth embodiment of the present invention, the first, second, third, fourth, and fifth embodiments are further modified so that each of the two peripheral projecting lips (46a, 46b, 146a, 146b) of the support elements (20a, 20b, 120a, 120b) projects an amount comprised of between 1 mm and 5 mm. In accordance with a seventh embodiment of the present invention, the first, second, third, fourth, fifth and sixth embodiments are further modified so that the magnets (26a, 26b, 126a, 126b) are made of an alloy of Nd—Fe—B, that is an alloy of neudymium, iron, boron. In accordance with an eighth embodiment of the present invention, the first, second, third, fourth, fifth and sixth embodiments are further modified so that the magnets (26a, 26b, 126a, 126b) are made of elements belonging to rare earths.

In accordance with a ninth embodiment of the present invention, the first, second, third, fourth, fifth, sixth, seventh and eighth embodiments are further modified so that the magnets (26a, 26b, 126a, 126b) have a parillenic covering (i.e., a covering made of parylene). In accordance with a tenth embodiment of the present invention, the first, second, third, fourth, fifth, sixth, seventh, eighth and ninth embodiments are further modified so that each of the two support elements (20a, 20b, 120a, 120b) has a cavity (30a, 30b) wherein the magnet (26a, 26b) is inserted. In accordance with an eleventh embodiment of the present invention, the first, second, third, fourth, fifth, sixth, seventh, eighth, ninth and tenth embodiments are further modified so that each of the two support elements (20a, 20b, 120a, 120b) has an essentially circular shape. In accordance with a twelfth embodiment of the present invention, the first, second, third, fourth, fifth, sixth, seventh, eighth, ninth, tenth and eleventh embodiments are further modified so that the second support element (20b, 120b) comprises a ball joint (12, 112) suitable for sustaining an aquarium fitting. In accordance with a thirteenth embodiment of the present invention, the first, second, third, fourth, fifth, sixth, seventh, eighth, ninth, tenth, eleventh and twelfth embodiments are further modified so that the flexible material is an elastomer.

BRIEF DESCRIPTION OF THE DRAWINGS

These and other advantages of the present invention will be more evident from the following detailed description of an embodiment made only for an illustrative and not limitative purpose with reference to the following drawings wherein.

DETAILED DESCRIPTION OF THE INVENTION

Figure 1:
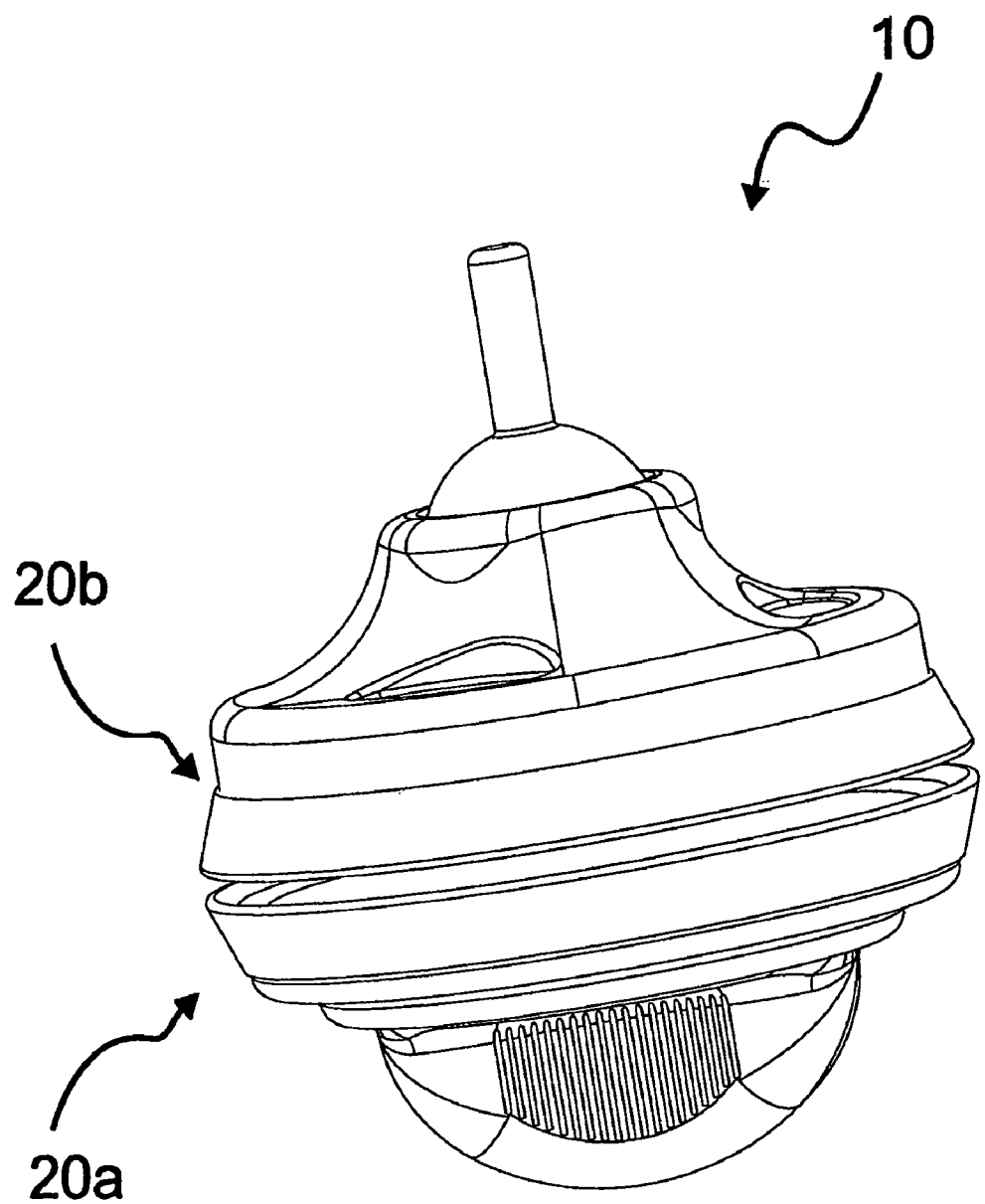
FIG. 1 is a perspective view of a support according to the present invention.

In FIG. 1, a magnetic support is generally indicated with reference 10 for the sustaining of fittings for aquariums. The magnetic support 10 comprises a first support element 20a and a second support element 20b. The first support element 20a is fixed to the outside wall of an aquarium, whereas the second support element 20b is fixed to the inside wall of the aquarium. In particular, the second support element 20b has a ball joint 12 suitable for sustaining a fitting for aquariums such as a filter, a pump or others.

Figure 2:
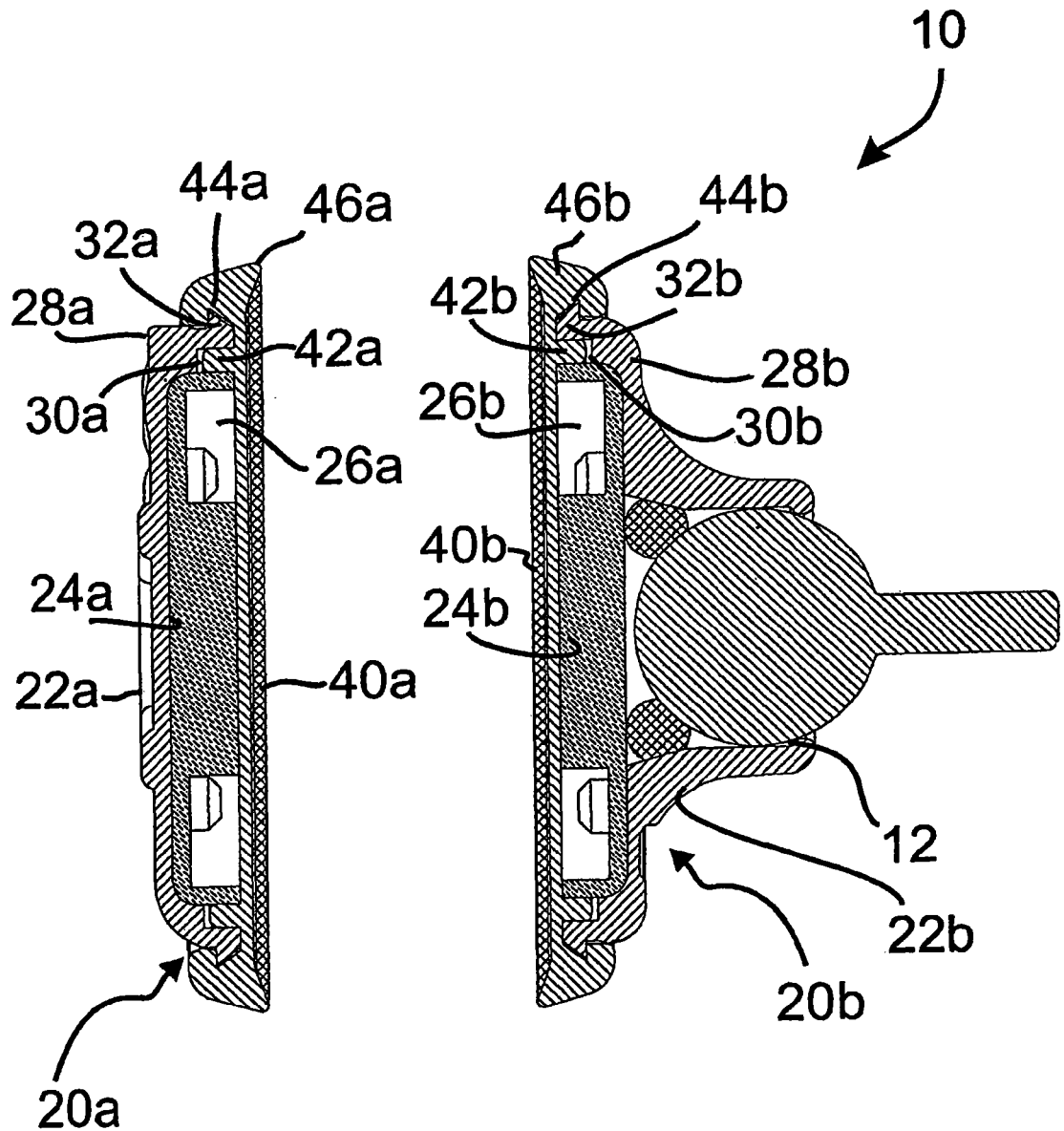
FIG. 2 is a transverse section view of a magnetic support according to the present invention where the two support elements are represented separated from each other.

In the following description, since the two support elements 20a, 20b, have many components in common, for an easy reference letter "a" will be used for the first support element 20a and letter "b" will be used for the second support element 20b. As better noted from FIGS. 2 and 3, each of the support elements 20a,20b is composed of a circular cup 22a, 22b forming a cylindrical cavity 24a,24b. A magnet 26a,26b is firmly and respectively positioned inside each circular cup 22a,22b. Each magnet 26a,26b has a hollow cylindrical shape the diameter of which is essentially equal to the diameter of cylindrical cavity 24a,24b wherein each magnet is inserted, so that the outside cylindrical surface of each magnet 26a,26b is in contact with the cylindrical cavity 24a,24b of the respective circular cup 22a,22b. Each cylindrical cavity 24a,24b is then covered respectively by a circular element 40a,40b essentially flat made up of flexible material, in particular an elastomer. The peripheral edge 28a,28b of each circular cup 22a,22b has a circular cavity 30a,30b wherein a circular projection 42a,42b respectively of the flat element 40a,40b is inserted, so as to facilitate the assembly of each flat element 40a,40b on the respective circular cup 22a,22b. Furthermore, each peripheral edge 28a,28b of each cup 22a,22b has a locking projecting tooth 32a,32b which penetrates inside a corresponding recess 44a,44b made in the respective flat element 40a,40b, thereby obtaining the secure locking of the flat element 40a,40b to the respective cup 22a,22b.

At its outside circular edge, each flat element 40a,40b has a peripheral projecting lip 46a,46b that extends beyond the peripheral edge 28a,28b of the respective support element 20a,20b so as to form a sucker. For an efficient action, the peripheral projecting lips 46a,46b of each of the two support elements 20a,20b projects an amount comprised of between 1 mm and 5 mm.

Figure 3:
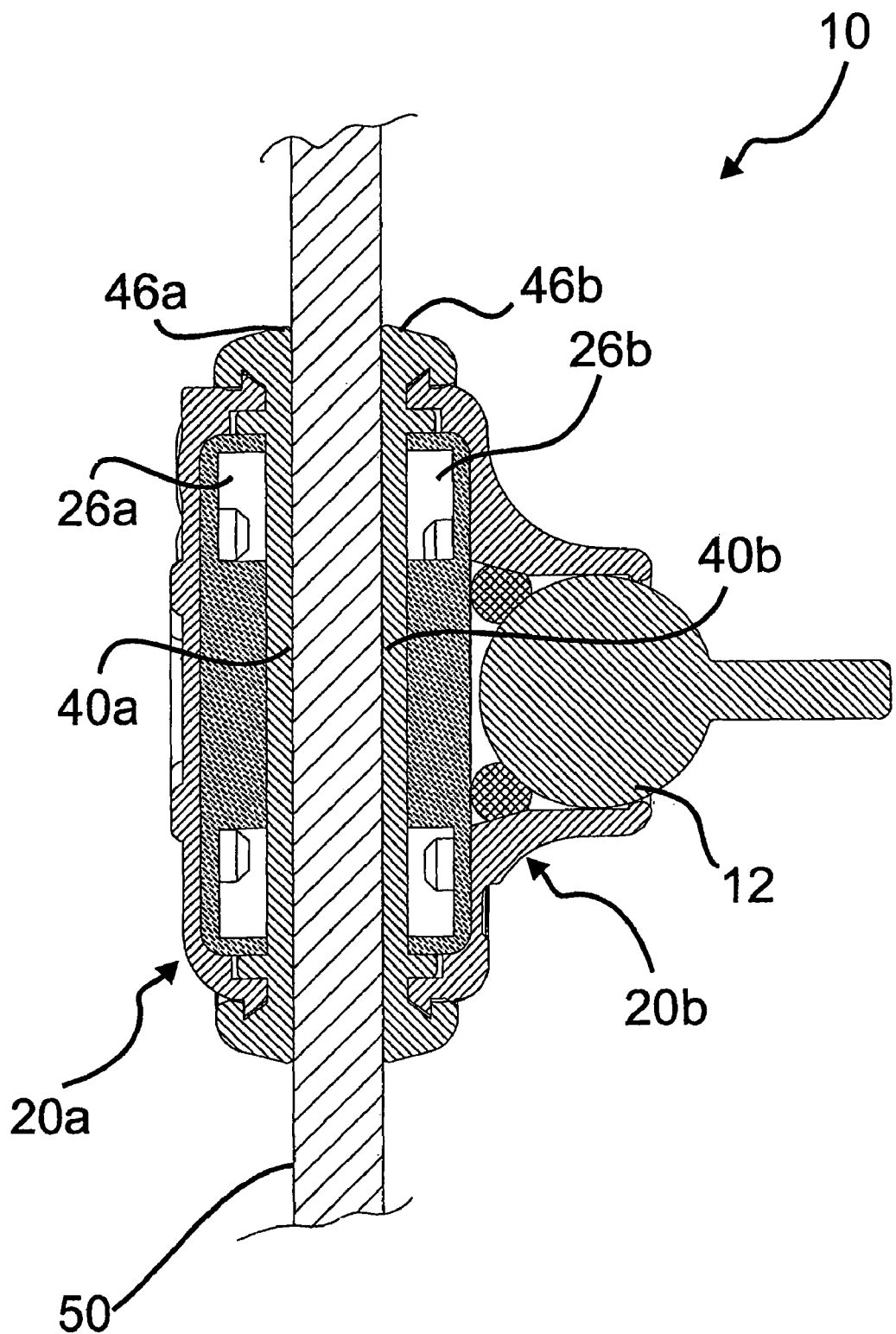
FIG. 3 is a cross-section similar to those of FIG. 1 wherein the two support elements are placed and locked against an aquarium wall.

In FIG. 3, the magnetic support 10 is depicted and applied on the wall 50 of an aquarium where the second support element 20b is positioned inside the aquarium. The magnetic attracting force which operates between the two magnets 26a,26b flattens the peripheral projecting lips 46a,46b of the respective flat elements 40a,40b against the aquarium, thus generating a suction effect which cause the support elements 20a,20b to better adhere to the wall 50. Consequently, the magnetic force generated by the two magnets 26a,26b may be even very weak since part of the locking force between the two support elements 20a,20b and the wall 50 is generated by the suction effect of each flat element 40a,40b. During the mounting operation of the magnetic support 10, not only does the locking occur gradually and gently, but also the unlocking operation occurs easily and rapidly. In fact, it is sufficient to first eliminate the suction effect, for example slightly folding the two support elements 20a,20b, so as to raise the peripheral lips 46a,46b and finally to separate the two support elements 20a,20b from the wall 50. Since the magnetic support does not undergo high amounts of stress during the disassembly operation, it is also reliable and durable.

Figure 4:
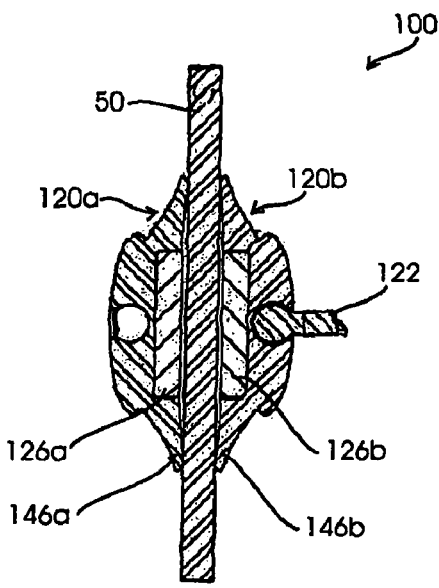
FIG. 4 is a transverse section of a magnetic support according to a variant of the invention wherein the two support elements are placed and locked against an aquarium wall.

In FIG. 4, a variant of the magnetic support is entirely indicated with reference 100 wherein elements corresponding to those used in the magnetic support 10 are indicated with the same number plus 100. The magnetic support 100 (see FIGS. 5 and 6) is composed of two identical support elements 120a,b, the first one indicated with the letter "a" and the second one with letter "b". Each support element 120a,120b is made with flexible material, such as an elastomer, and is cap-shaped with a peripheral projecting lip 146a,146b having a circular shape in order to form a sucker. Each support element 120a,b has a cylindrical cavity 124a,124b inside which a respective magnet 126a,126b is inserted. A spherical seat 121a,121b is made at the top of each support element 120a,120b. A joint ball 122 is inserted in the spherical seat 121b of the second support element 120b so as to sustain an aquarium fitting.

In FIG. 4, the magnetic support 100 is applied on the glass wall of an aquarium and, similarly to the magnetic support 10, it can be noted that the peripheral lips 146a,146b are flattened against the wall 50. Due to the flexibility of the material, the peripheral lips 146a,146b are flattened, so creating a suction effect as already described above.

In order to facilitate the assembly and the disassembly of the magnetic support 100, each support element 120a, 120b is respectively provided with a tab 148a, 148b placed near the peripheral lip 146a, 146b. The magnets 26a, 26b, 126a, 126b are preferably made of Nd—Fe—B, that is an alloy of neudymium, iron, boron which is able to generate a powerful magnetic field, so allowing for further reduction of the dimension of the magnetic support, but maintaining unchanged the capability of sustaining any fitting. Alternatively, the magnets 26a, 26b, 126a, 126b can be made of elements belonging to rare earths. The magnets 26a, 26b, 126a, 126b have a parillenic covering (i.e., a covering made of parylene), thus assuring an optimum resistance to the aggression of water, even salt water. This characteristic is highly desirable in an environment such as that of an aquarium.

Figure 5:
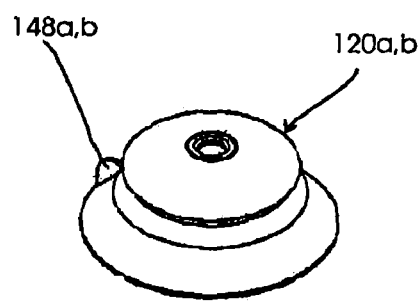
FIG. 5 is a perspective view of an element of the magnetic support of FIG. 4.
Figure 6:
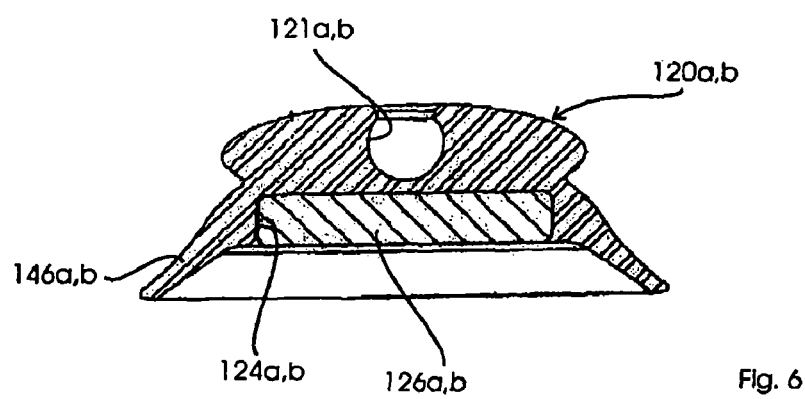
FIG. 6 is a transverse section of the support element of FIG. 5.
Figure 7:
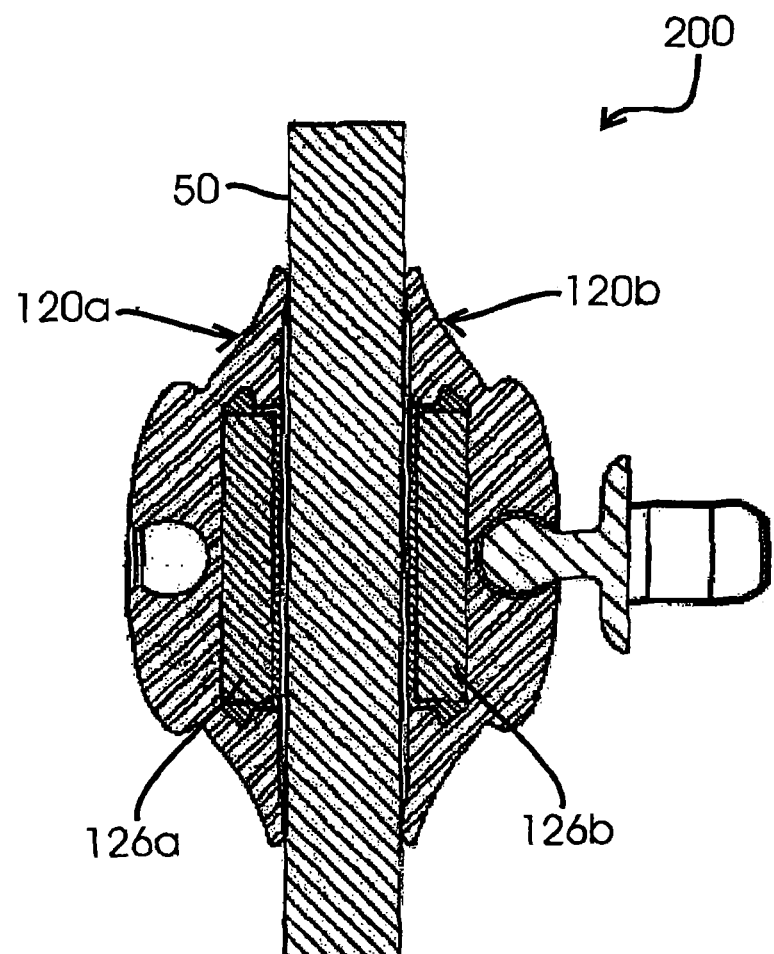
FIG. 7 is a transverse section of the magnetic support applied on an aquarium wall according to a variant of the support of FIGS. 4, 5 and 6.
Figure 8:
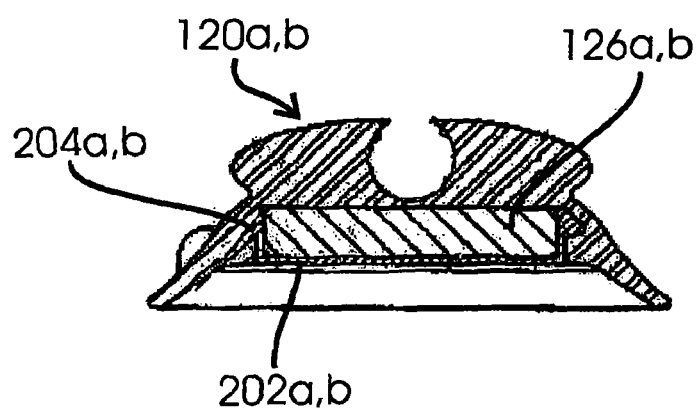
FIG. 8 is a transverse section of the support element of FIG. 7.

FIG. 7 shows a magnetic support 200, which represents a simple variant of the magnetic support 100 previously described with reference to FIGS. 4, 5 and 6. The magnetic support 200 is similar to the magnetic support 100, except that an interconnecting element 202a, b is interposed between the magnet 126a, b and the support element 120a, b having a cylindrical shape with a base, preferably made of an elastomer. The cylindrical wall of the interconnecting element 202a, b wraps the magnet 126a, b around its cylindrical surface which is in contact with the support element 120a, b, whereas the base of the interconnecting element 202a, b covers the front surface of the magnet 126a, b which comes into contact with the glass wall 50 of the aquarium.

An annular projection 204a, b is made on the cylindrical wall of the interconnecting element 202a, b which engages a corresponding annular groove made in the support element 120a, b. In so doing, the following advantages are reached:
  the magnet 126a, b is better protected against the aggression of the water contained in the aquarium;
  the support element 120a, b can be easily attached and detached from the wall 50 of the aquarium, so facilitating its assembly and removal when required.

It is evident that any conceptually or functionally equivalent change or variation falls inside the scope of the present invention. For example, it is possible to use different means to fix the flat element to the circular cup, or the various components of the magnetic support may have a shape different from the circular shape described above. The flat element made of flexible material could be used only in the second support element where the maximum adhesion force to the aquarium wall is required, since it has to sustain a fitting such as a pump or a filter. Alternatively, it is possible to use more flat elements made of flexible material, such as more than one sucker for each support element.

The invention claimed is:

1. A magnetic support for aquariums, comprising:
   (a) a first support element suitable for sustaining an aquarium fitting; and
   (b) a second support element, wherein each of the first support element and the second support element comprises at least one magnet so that the first support element and the second support are coupled with an aquarium wall interposed between the first support element and the second support element so that an attracting magnetic force operating between the two magnets locks the first support element and the second support element against the wall, wherein each of the first support element and the second support element comprises an essentially flat element made up of flexible material and having a peripheral projecting lip made of the same flexible material; so that when the two support elements are coupled together interposing the wall, the peripheral projecting lip of the first support element is flattened against the wall, or the peripheral projecting lip of the second support element is flattened against the wall, or the peripheral protecting lip of the first support element and the second support element is flattened against the wall, thus creating a suction effect that gradually and firmly locks the first support element and the second support element to the wall, and
   wherein the essentially flat element covers the front surface of the magnet that comes into contact with the wall of an aquarium.

2. A magnetic support for aquariums according to claim 1, wherein said first support element and said second support element comprise an interconnecting element interposed between said support elements and said magnet.

3. A magnetic support for aquariums according to claim 2, wherein each of said interconnecting elements covers a front surface of said magnet that comes into contact with the wall of an aquarium.

4. A magnetic support for aquariums according to claim 1, wherein said magnets are made of an alloy of Nd—Fe—B that includes neudymium, iron, and boron.

5. A magnetic support for aquariums according to claim 1, wherein said magnets are made of elements belonging to rare earths.

6. A magnetic support for aquariums according to claim 1, wherein said magnets have a covering made of parylene.

7. A magnetic support for aquariums according to claim 1, wherein each of said two support elements has a cavity formed therein and a magnet inserted in the cavity.

8. A magnetic support for aquariums according to claim 7, wherein each of said two support elements has an essentially circular shape.

9. A magnetic support for aquariums according to claim 1, wherein said flexible material is an elastomer.

10. A magnetic support for aquariums, comprising:
(a) a first support element suitable for sustaining an aquarium fitting; and
(b) a second support element, wherein the second support element comprises a ball joint suitable for sustaining the aquarium fitting, and each of the first support element and the second support element comprises at least one magnet so that the first support element and the second support are coupled with an aquarium wall interposed between the first support element and the second support element so that an attracting magnetic force operating between the two magnets locks the first support element and the second support element against the wall, wherein at least one of the first support element and the second support element comprises a peripheral projecting lip made up of flexible material so that when the two support elements are coupled together interposing the wall, the peripheral projecting lip of the first support element is flattened against the wall, or the peripheral projecting lip of the second support element is flattened against the wall, or the peripheral projecting lip of the first support element and the second support element is flattened against the wall, thus creating a suction effect that gradually and firmly locks the first support element and the second support element to the wall.

11. A magnetic support for aquariums, comprising:
(a) a first support element suitable for sustaining an aquarium fitting; and
(b) a second support element, wherein each of the first support element and the second support element comprises at least one magnet so that the first support element and the second support are coupled with an aquarium wall interposed between the first support element and the second support element so that an attracting magnetic force operating between the two magnets locks the first support element and the second support element against the wall, wherein each of the first support element and the second support element comprises a peripheral projecting lip made up of flexible material so that when the two support elements are coupled together interposing the wall, the peripheral projecting lip of the first support element is flattened against the wall, or the peripheral projecting lip of the second support element is flattened against the wall, or the peripheral projecting, lip of the first support element and the second support element is flattened against the wall, thus creating a suction effect that gradually and firmly locks the first support element and the second support element to the wall, and
wherein each of the peripheral projecting lips of the first support element and the second support element projects an amount that is between 1 mm and 5 mm.

* * * * *